United States Patent
Jeon et al.

(10) Patent No.: US 11,552,342 B2
(45) Date of Patent: Jan. 10, 2023

(54) BATTERY MODULE AND BATTERY PACK INCLUDING THE SAME

(71) Applicant: LG Chem, Ltd., Seoul (KR)

(72) Inventors: Hyun Wook Jeon, Daejeon (KR); Youngsun Yun, Daejeon (KR)

(73) Assignee: LG Energy Solution, Ltd.

( * ) Notice: Subject to any disclaimer, the term of this patent is extended or adjusted under 35 U.S.C. 154(b) by 200 days.

(21) Appl. No.: 16/625,328

(22) PCT Filed: Nov. 15, 2018

(86) PCT No.: PCT/KR2018/014015
§ 371 (c)(1),
(2) Date: Dec. 20, 2019

(87) PCT Pub. No.: WO2019/124749
PCT Pub. Date: Jun. 27, 2019

(65) Prior Publication Data
US 2020/0411918 A1    Dec. 31, 2020

(30) Foreign Application Priority Data
Dec. 20, 2017  (KR) .................. 10-2017-0176418

(51) Int. Cl.
*H01M 10/48* (2006.01)
*H01M 50/20* (2021.01)
(Continued)

(52) U.S. Cl.
CPC ....... *H01M 10/482* (2013.01); *H01M 10/425* (2013.01); *H01M 50/20* (2021.01);
(Continued)

(58) Field of Classification Search
CPC ............ H01M 10/482; H01M 10/425; H01M 50/502; H01M 50/262; H01M 50/54; H01M 50/20
See application file for complete search history.

(56) References Cited

U.S. PATENT DOCUMENTS 9,362,536 B2   6/2016   Niedzwiecki et al.
2009/0305116 A1  12/2009   Yang et al.
(Continued)

FOREIGN PATENT DOCUMENTS

CN      105684188 A    6/2016
EP       3166158 A1    5/2017
(Continued)

OTHER PUBLICATIONS

Extended European Search Report including Written Opinion for Application No. EP18892230.6 dated Aug. 18, 2020, 11 pgs.
(Continued)

*Primary Examiner* — Christopher P Domone
*Assistant Examiner* — Kimberly Wyluda
(74) *Attorney, Agent, or Firm* — Lerner, David, Littenberg, Krumholz & Mentlik, LLP

(57) ABSTRACT

A battery module according to an exemplary embodiment of the present invention includes: a housing receiving a plurality of battery cells and including a bottom plate and a lateral plate; and a connection board disposed at one end or both ends of the housing, wherein the connection board is bonded to the lateral plate. The lateral plate may include a plurality of bus bar supporting members, at least some among the plurality of bus bar supporting members having a hooking protrusion protruded upward. The connection board may include a hooking member having a hooking groove opened downward. Thus, the hooking protrusion (Continued)

may be inserted into the hooking groove in a state in which the connection board is bonded to the lateral plate.

13 Claims, 11 Drawing Sheets

(51) Int. Cl.
    *H01M 50/262*     (2021.01)
    *H01M 50/502*     (2021.01)
    *H01M 50/54*     (2021.01)
    *H01M 10/42*     (2006.01)

(52) U.S. Cl.
    CPC ....... *H01M 50/262* (2021.01); *H01M 50/502* (2021.01); *H01M 50/54* (2021.01)

(56) References Cited

U.S. PATENT DOCUMENTS

| | | |
|---|---|---|
| 2013/0071721 A1 | 3/2013 | Ogasawara et al. |
| 2014/0065467 A1 | 3/2014 | Choi et al. |
| 2015/0155533 A1 | 6/2015 | Kim et al. |
| 2015/0162648 A1 | 6/2015 | Yang et al. |
| 2016/0020446 A1 | 1/2016 | Zheng et al. |
| 2016/0233465 A1 | 8/2016 | Lee et al. |
| 2016/0248070 A1 | 8/2016 | Ahn |
| 2017/0077562 A1 | 3/2017 | Park et al. |
| 2019/0074557 A1 | 3/2019 | Shin et al. |
| 2019/0355959 A1* | 11/2019 | Ro .................... H01M 50/50 |

FOREIGN PATENT DOCUMENTS

| | | |
|---|---|---|
| JP | 2002352820 A | 12/2002 |
| JP | 2006339100 A | 12/2006 |
| JP | 2009529217 A | 8/2009 |
| JP | 2014519153 A | 8/2014 |
| JP | 2015518258 A | 6/2015 |
| JP | 2017526102 A | 9/2017 |
| KR | 101298872 B1 | 8/2013 |
| KR | 20150104733 A | 9/2015 |
| KR | 20170050509 A | 5/2017 |
| KR | 20170057740 A | 5/2017 |
| KR | 20170095052 A | 8/2017 |
| KR | 101792161 B1 | 10/2017 |
| KR | 20170138200 A | 12/2017 |
| WO | 2011142201 A1 | 11/2011 |
| WO | 2017138704 A1 | 8/2017 |

OTHER PUBLICATIONS

International Search Report for Application No. PCT/KR2018/014015, dated Mar. 7, 2019, pp. 1-2.

* cited by examiner

BATTERY MODULE AND BATTERY PACK INCLUDING THE SAME

CROSS-REFERENCE TO RELATED APPLICATION

This application is a national phase entry under 35 U.S.C. § 371 of International Application No. PCT/KR2018/014015 filed Nov. 15, 2018, which claims priority from Korean Patent Application No. 10-2017-0176418 filed on Dec. 20, 2017, the entire contents of which are incorporated herein by reference.

BACKGROUND OF THE INVENTION

(a) Field of the Invention

The present invention relates to a battery module and a battery pack including the same, and in detail, relates to a battery module including a connection board having a fixing structure and a battery pack including the same.

(b) Description of the Related Art

As technology development and demand for mobile devices are increased, demand for rechargeable batteries as an energy source is rapidly growing. Accordingly, a lot of research on a rechargeable battery cell satisfying various needs is being conducted.

The rechargeable battery is attracting much attention as an energy source for power devices such as electric bicycles, electric vehicles, and hybrid electric vehicles, as well as mobile devices such as mobile phones, digital cameras, and laptops.

A small cell pack is used for small devices such as mobile phones and cameras, but a medium or large sized battery pack in which a battery module or a battery pack packed with two or more battery cells in parallel and/or coupled in series is used in medium and large devices such as laptops and electric vehicles.

In this middle or large sized battery pack, a stability problem of the rechargeable battery is very important. Here, since a large number of battery cells are used, an abnormal operation in some battery cells may cause a chain reaction in other battery cells, and resulting ignition and explosion may cause a serious accident. Accordingly, in the conventional middle or large sized battery module or battery pack, a safety system including a sensing device capable of measuring a voltage and a temperature of the battery cells, a connection member for connecting the sensing device and a battery management system (BMS), and the BMS for controlling the battery based on measured values, may be provided. However, for the middle or large sized battery module or battery pack, it is necessary to minimize a space occupied by the safety system in order to increase energy density and minimize the size of the battery pack.

In addition, the battery module has external input and output terminals to supply power to an external device. In order to minimize the space occupied by the external input and output terminal configuration in the battery module, the external input and output terminal configuration is installed with a small size outside the battery module. However, these configurations are not tightly fixed in the battery module, so defects such as a welding part damage, a cell lead breakage, or a bus bar soldering crack may occur due to external force.

The above information disclosed in this Background section is only for enhancement of understanding of the background of the invention and therefore it may contain information that does not form the prior art that is already known in this country to a person of ordinary skill in the art.

SUMMARY OF THE INVENTION

A battery module according to an exemplary embodiment of the present invention provides a structure for preventing the defects such as the welding part damage, the cell lead breakage, the bus bar soldering crack, and the like even if the external force is applied, by tightly fixing a connection board connecting the external input and output terminals to the battery module.

A battery module according to the present invention is intended to provide a battery module for preventing the connection board from being detached from the battery module even in vibration and impact.

However, objects to be solved by the embodiments of the present invention are not limited to the above-mentioned problems, and can be variously extended within the scope of the technical idea included in the present invention.

A battery module according to an exemplary embodiment of the present invention includes: a housing receiving a plurality of battery cells and including a bottom plate and a lateral plate; and a connection board disposed at one end or both ends of the housing, wherein the connection board is bonded to the lateral plate, the lateral plate includes a plurality of bus bar supporting members, at least some among the plurality of bus bar supporting members have a hooking protrusion protruded upward, and the connection board includes a hooking member having a hooking groove opened downward, thereby the hooking protrusion is inserted to the hooking groove in a state in which the connection board is bonded to the lateral plate.

The plurality of bus bar supporting members may be divided into a first bus bar supporting member without the hooking protrusion and a second bus bar supporting member having the hooking protrusion, and the first bus bar supporting member and the second bus bar supporting member may be alternately disposed.

An end plate covering the connection board outside may be further included, and the connection board may be disposed between the lateral plate and the end plate.

A top cover covering the housing, the connection board, and the end plate may be further included, the top cover may have at least one bar type of coupling part, the connection board may have at least a pair of coupling protrusions formed at an upper end, and the bar type of coupling part may be inserted between a pair of coupling protrusions.

A battery module according to an exemplary embodiment of the present invention includes: a housing receiving a plurality of battery cells and including a bottom plate and a lateral plate; a connection board disposed at one end or both ends of the housing; and a top cover covering the housing, the plurality of battery cells, and the connection board, wherein the top cover has at least one bar type of coupling part, the connection board has at least a pair of coupling protrusions formed at an upper end, and the bar type coupling part is inserted between a pair of coupling protrusions.

According to an exemplary embodiment of the present invention, as the fixing protrusion formed on the lateral plate is inserted to the fixing groove formed on the connection board, the connection board is tightly fixed to the lateral plate.

According to an exemplary embodiment of the present invention, as the end plate covers and presses the connection board, the connection board is more firmly fixed.

Also, according to an exemplary embodiment of the present invention, the upper end of the connection board is also bonded to the top cover to be more firmly fixed.

DETAILED DESCRIPTION OF THE EMBODIMENTS

Figure 1:
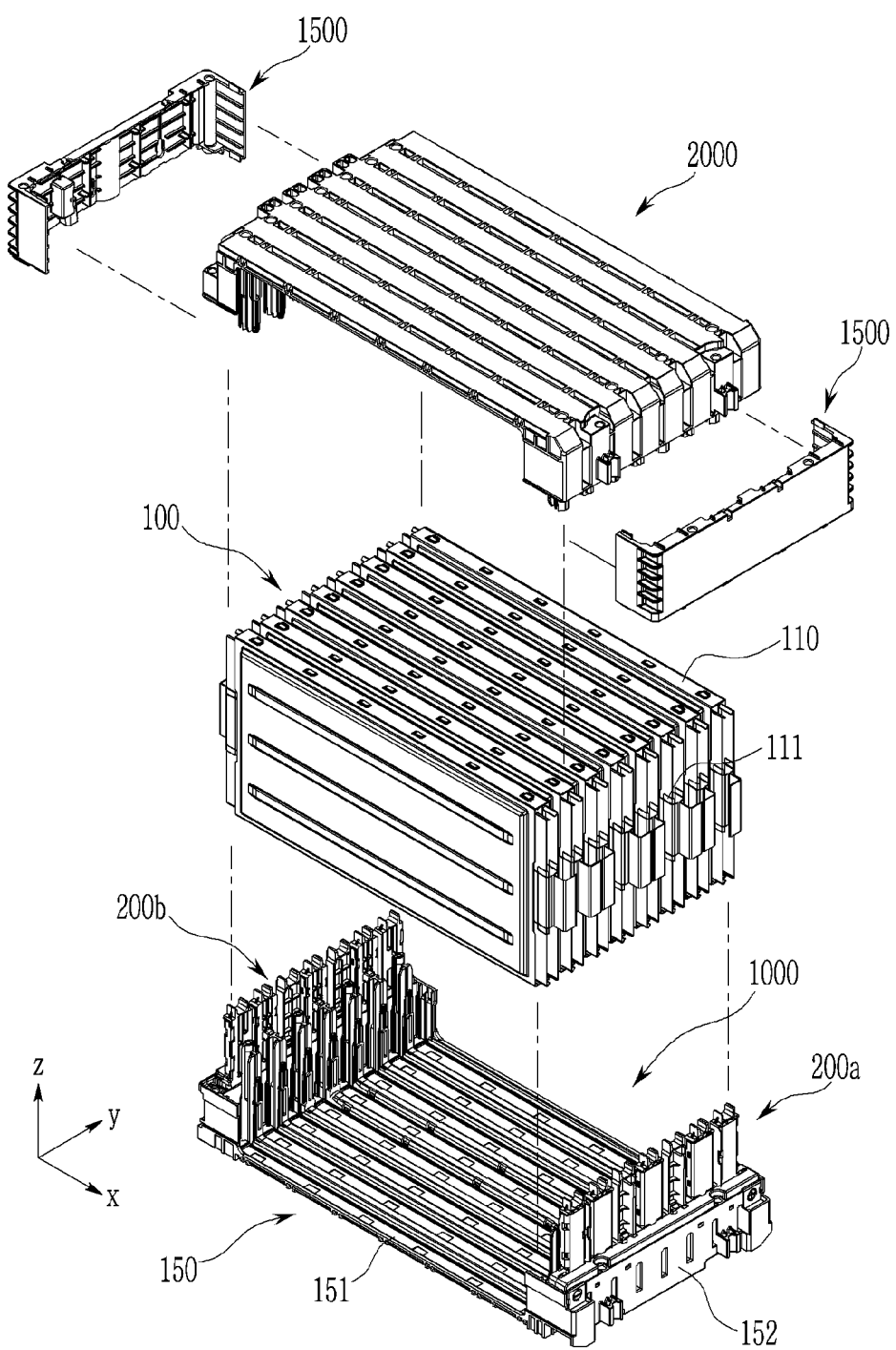
FIG. 1 is an exploded perspective view schematically showing a battery module according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Further, in the drawings, a size and thickness of each element are arbitrarily represented for better understanding and ease of description, and the present invention is not limited thereto. In the drawings, the thickness of layers, films, panels, regions, etc., are exaggerated for clarity. In the drawings, for better understanding and ease of description, the thicknesses of some layers and areas are exaggerated.

In addition, it will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "on a plane" means viewing a target portion from the top, and the phrase "on a cross-section" means viewing a cross-section formed by vertically cutting a target portion from the side.

FIG. 1 is an exploded perspective view schematically showing a battery module according to an exemplary embodiment of the present invention.

Referring to FIG. 1, a battery module according to the present exemplary embodiment may include a battery cell stacking member 100 including a plurality of battery cells 110, a housing 150 receiving the battery cell stacking member 100 and including a bottom plate 151 and a lateral plate 152, a top cover 2000 disposed at a side opposite to a part where the housing 150 is disposed based on the battery cell stacking member 100, and a pair of end plates 1500. A pair of lateral plates 152 are respectively connected to connection boards 200a and 200b.

Hereinafter, each constituent element of the battery module is described in detail with reference to FIG. 2 to FIG. 10.

Figure 2:
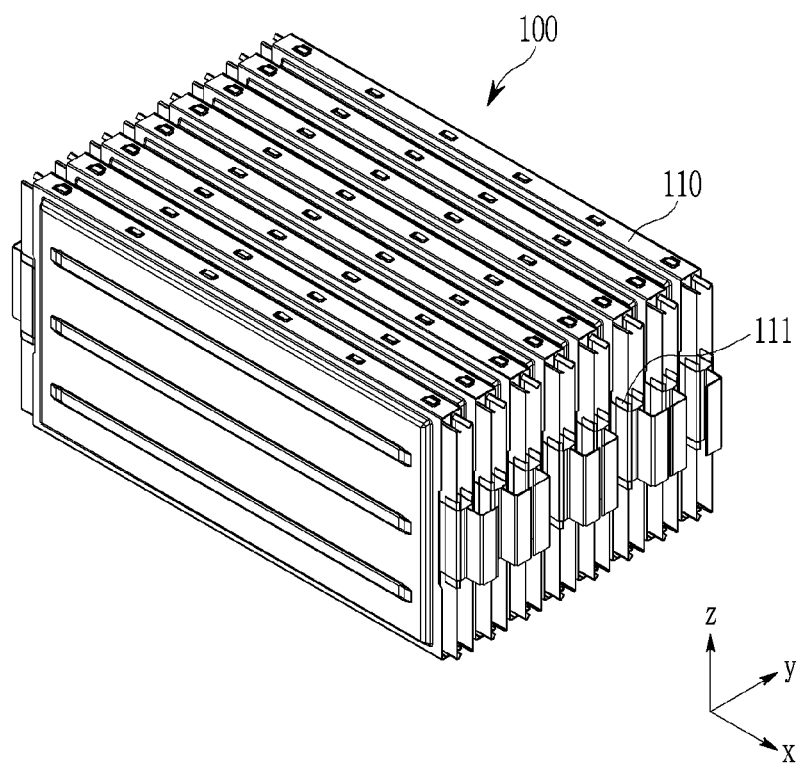
FIG. 2 is a perspective view schematically showing a configuration of a battery cell-stacking member.

FIG. 2 is an exploded perspective view schematically showing a battery module according to an exemplary embodiment of the present invention.

Referring to FIG. 2, the battery cell stacking member 100 is an assembly of a rechargeable battery including a plurality of battery cells 110. The battery cell stacking member 100 may include a plurality of pouch-type battery cells, and each battery cell includes an electrode lead 111. The electrode lead 111 is a positive lead or a negative lead, the electrode lead 111 of each pouch-type battery cell is protruded in the x-axis direction, and the end of the electrode lead 111 may be bent to the left or right in the y-axis direction. The electrode lead 111 of which the end is bent in one direction may be in contact with the electrode lead 111 included in an adjacent battery cell. Two electrode leads 111 in contact with each other may be fixed through welding, thereby electrically connecting the battery cells within the battery cell stacking member 100.

On the other hand, the battery cell stacking member 100 may include a cartridge (not shown) to arrange a plurality of pouch-type battery cells. The cartridge as a constituent element used to arrange a plurality of battery cells prevents movement of the battery cells by holding the battery cells, and guides a plurality of battery cells to be arranged. Such a cartridge may be configured in a form of a square ring with an empty central portion. In this case, four corners of the cartridge may be disposed at the external circumference of the battery cells.

Figure 3:
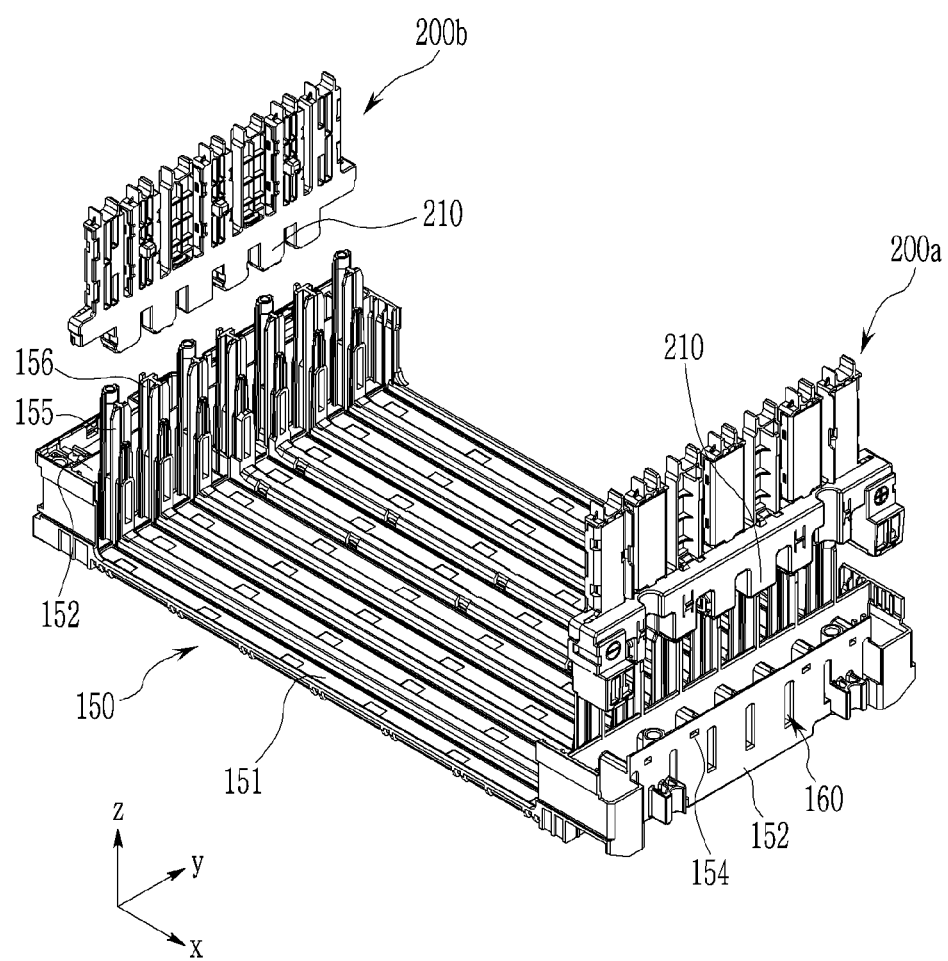
FIG. 3 is a perspective view showing a state in which a connection board is bonded to a housing of a battery module according to an exemplary embodiment of the present invention.
Figure 4:
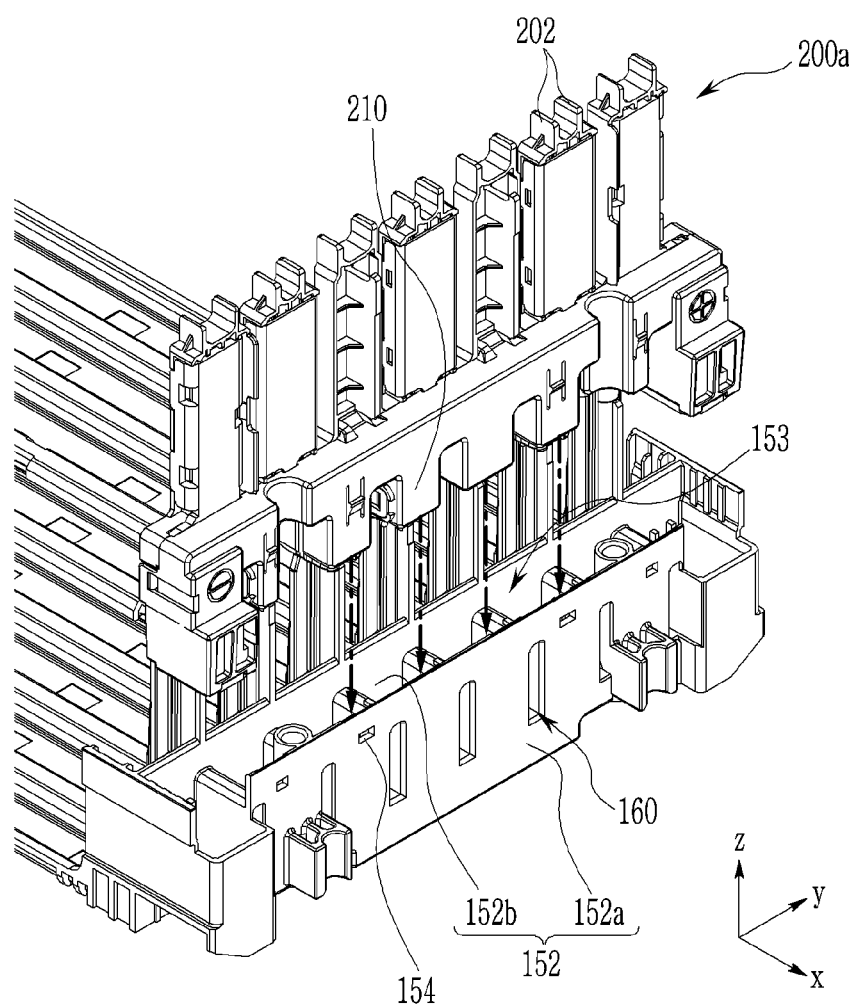
FIG. 4 is an enlarged view showing a configuration of a lateral plate to which a connection board disposed at a right side of FIG. 3 is inserted.
Figure 5:
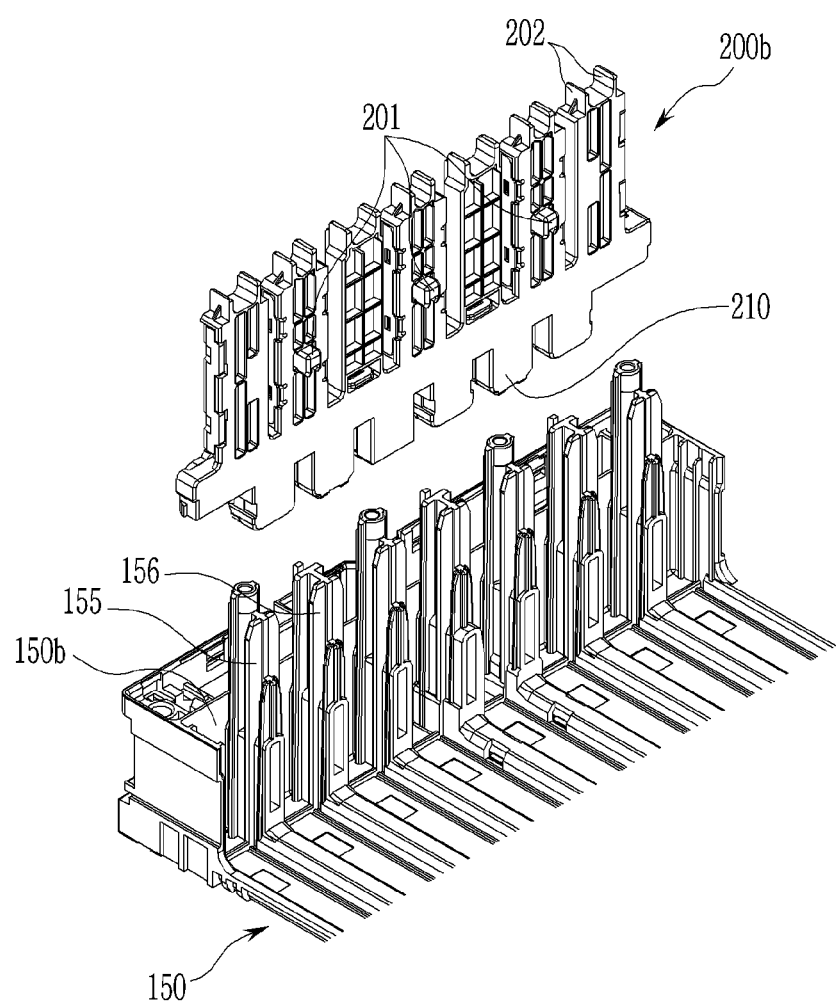
FIG. 5 is an enlarged view showing a configuration of a lateral plate to which a connection board disposed at a left side of FIG. 3 is inserted.
Figure 6:
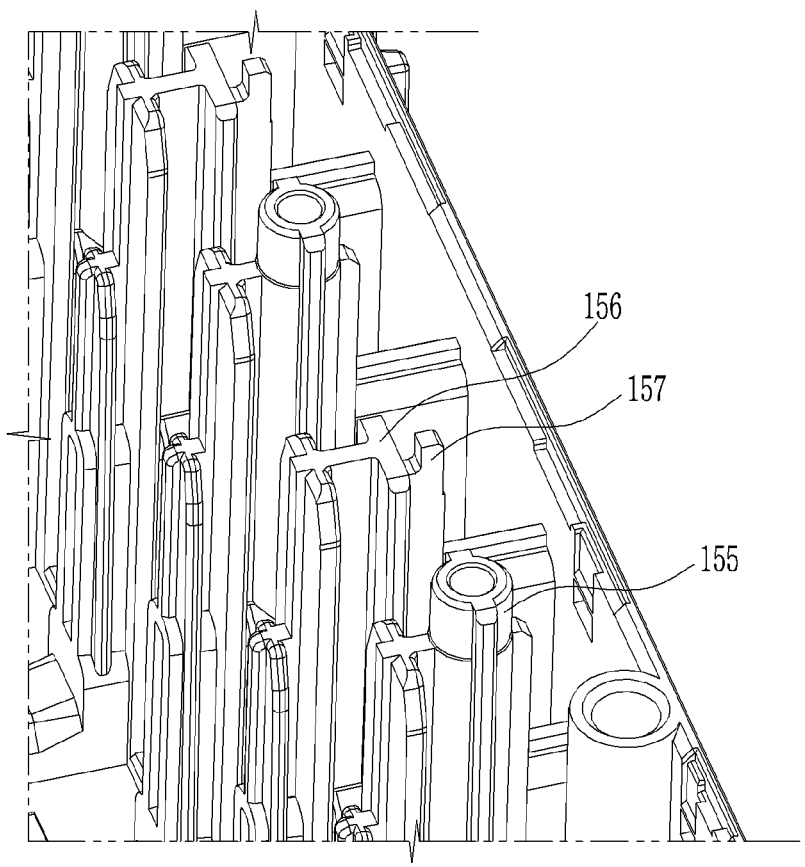
FIG. 6 is an enlarged view of a lateral plate disposed at a right side of FIG. 3.
Figure 7:
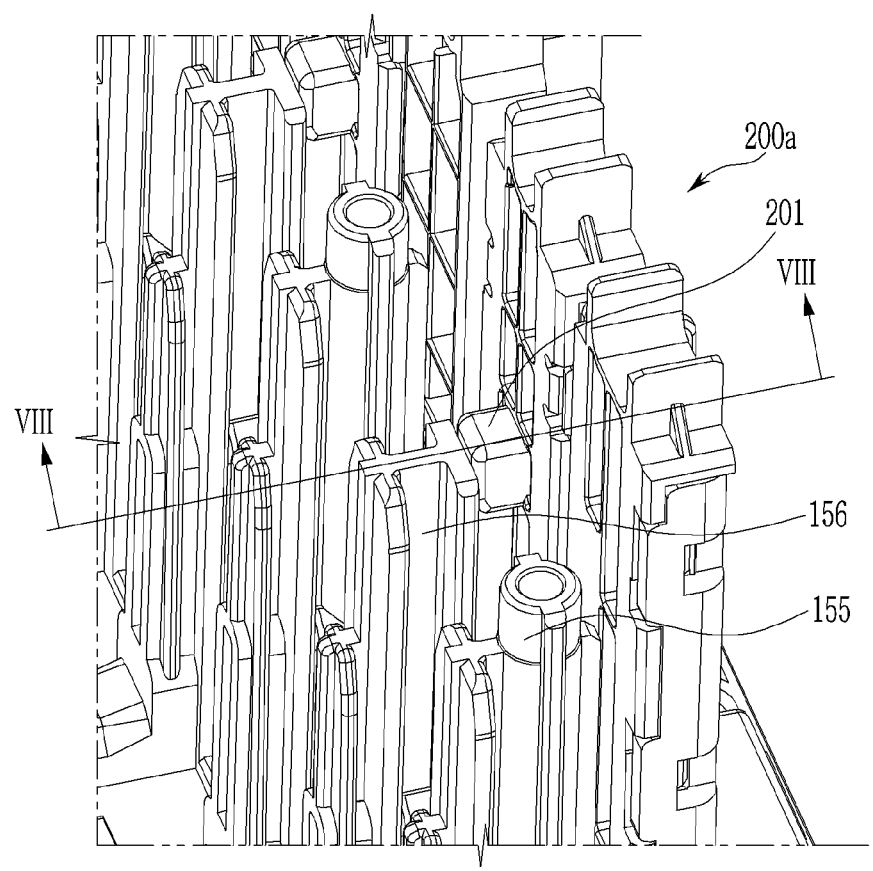
FIG. 7 is an enlarged view showing a configuration in which a connection board is bonded to a lateral plate disposed at a right side of FIG. 3.
Figure 8:
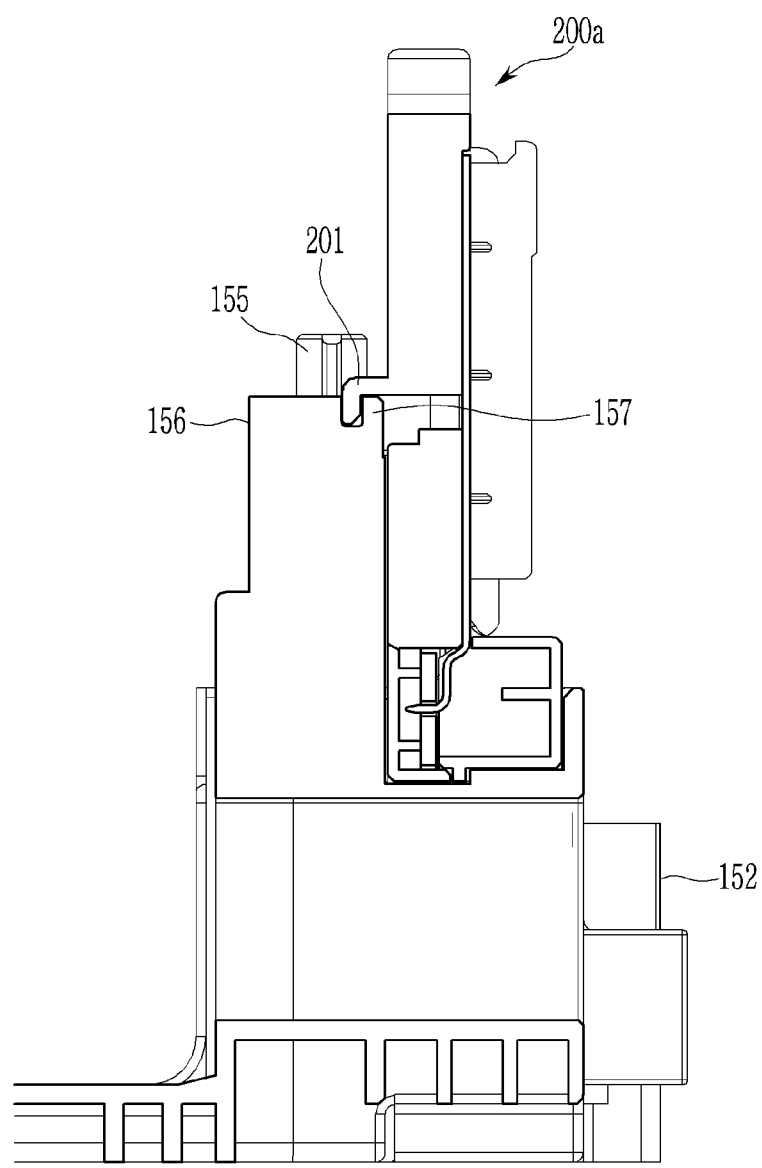
FIG. 8 is a cross-sectional view taken along a cross-sectional line VIII-VIII of FIG. 7.
Figure 9:
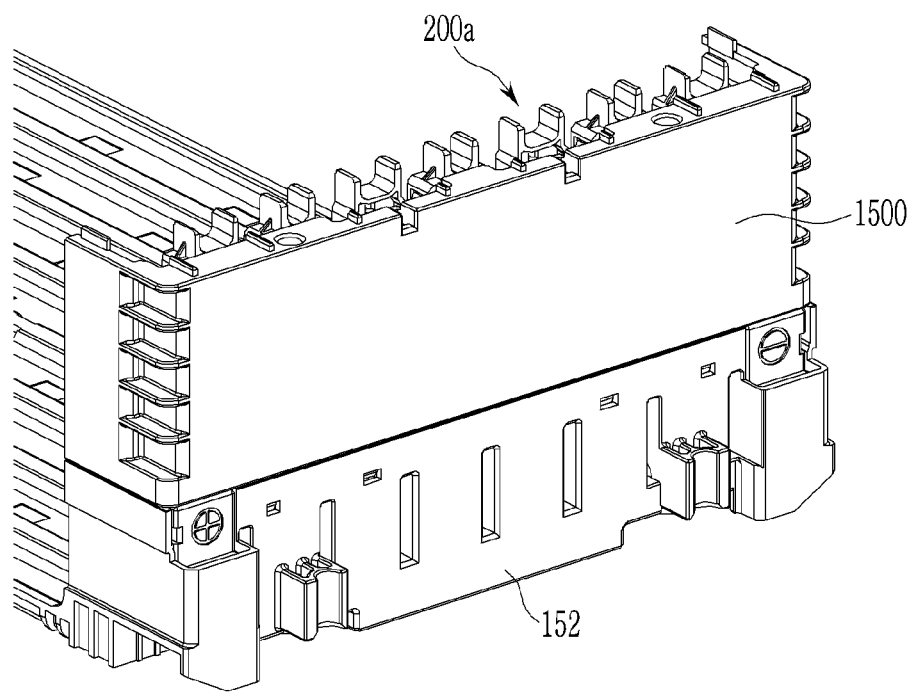
FIG. 9 is an enlarged view showing a configuration in which a connection board and an end plate are bonded to a housing of a battery module according to an exemplary embodiment of the present invention.
Figure 10:
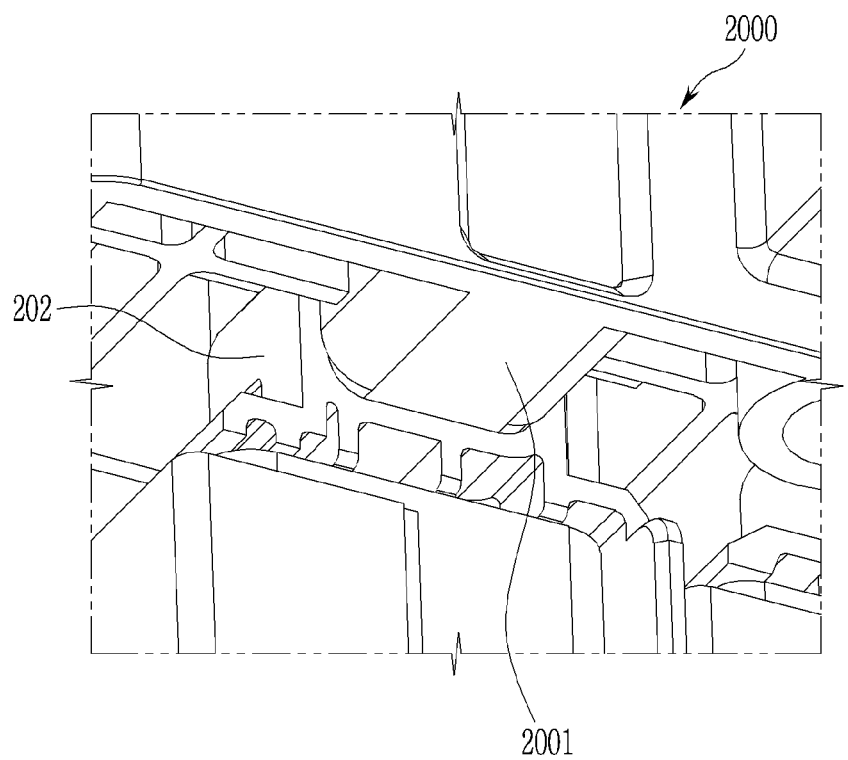
FIG. 10 is an enlarged view showing coupling between a connection board and a top cover of a battery module according to an exemplary embodiment of the present invention.
Figure 11:
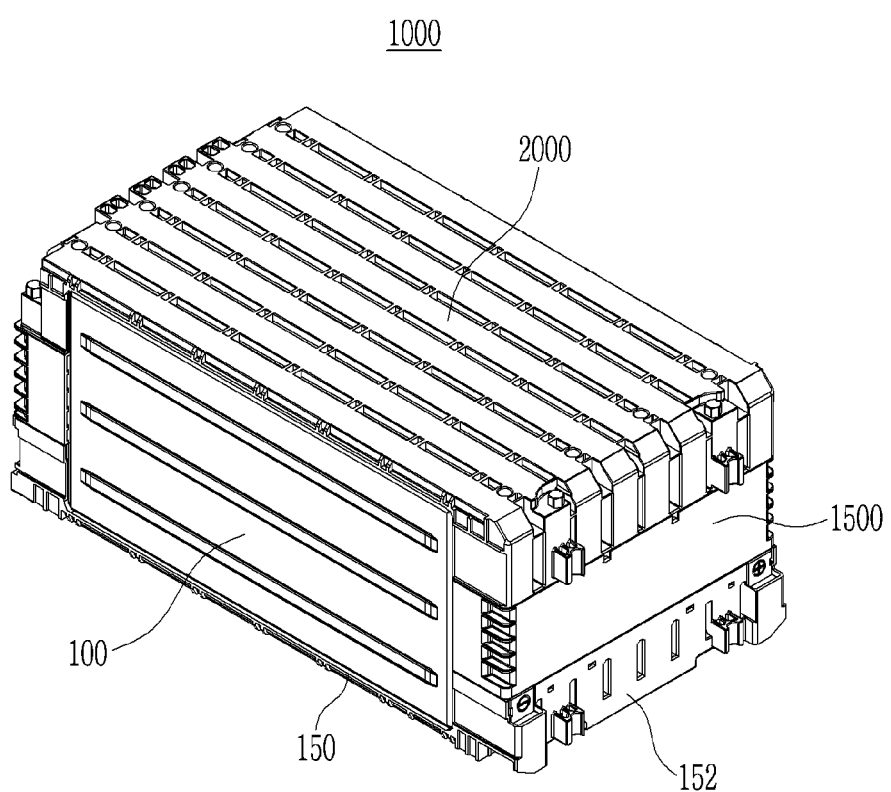
FIG. 11 is a perspective view of a battery module according to an exemplary embodiment of the present invention.

FIG. 3 is a perspective view showing a state in which a connection board is bonded to a housing of a battery module according to an exemplary embodiment of the present invention. FIG. 4 is an enlarged view showing a configuration of a lateral plate to which a connection board disposed at a right side of FIG. 3 is inserted. FIG. 5 is an enlarged view showing a configuration of a lateral plate to which a connection board disposed at a left side of FIG. 3 is inserted. FIG. 6 is an enlarged view of a lateral plate disposed at a right side of FIG. 3. FIG. 7 is an enlarged view showing a configuration in which a connection board is bonded to a lateral plate disposed at a right side of FIG. 3. FIG. 8 is a cross-sectional view taken along a cross-sectional line VIII-VIII of FIG. 7. FIG. 9 is an enlarged view showing a configuration in which a connection board and an end plate are bonded to a housing of a battery module according to an exemplary embodiment of the present invention. FIG. 10 is an enlarged view showing coupling between a connection board and a top cover of a battery module according to an exemplary embodiment of the present invention. FIG. 11 is a perspective view of a battery module according to an exemplary embodiment of the present invention.

Referring to FIG. 3, the housing 150 for receiving the battery cell stacking member 100 described in FIG. 1 includes the bottom plate 151 and the lateral plate 152. The lateral plate 152 may be formed to be perpendicular to the bottom plate 151 of the housing 150, and may be disposed at one end or both ends of the bottom plate 151. FIG. 3 shows that the lateral plate 152 is formed at both ends of the bottom plate 151.

In the present exemplary embodiment, the lateral plate 152 may be integrally formed with the bottom plate 151. To be integrally formed may mean that the lateral plate 152 and the bottom plate 151 are formed in one body through one injection process.

Referring to FIG. 3 to FIG. 5, the connection boards 200a and 200b are bonded to the lateral plate 152. Referring to FIG. 4 and FIG. 5, the connection boards 200a and 200b include a plurality of protrusions 210, and a plurality of air channels 160 are formed in the lateral plate 152. Referring to FIG. 4, the protrusions 210 of the connection boards 200a and 200b are bonded to the lateral plate 152 so as to be disposed between each of the adjacent air channels 160.

Referring to FIG. 4 and FIG. 5, the lateral plate 152 may include a first plate 152a including a plurality of air channels 160, and a second plate 152b including a plurality of first bus bar supporting members 155 and a plurality of second bus bar supporting members 156 protruded from one side. A mounting region 153 is formed between the first plate 152a and the second plate 152b, and the connection boards 200a and 200b may be inserted to the mounting region 153. The plurality of first bus bar supporting members 155 and the plurality of second bus bar supporting members 156 may prevent the connection boards 200a and 200b from moving in the y-axis direction after the connection boards 200a and 200b are bonded to the lateral plate 152.

Referring to FIG. 6 to FIG. 8, a hooking protrusion 157 is formed at the outer side surface of the second bus bar supporting member 156 of the lateral plate 152, and a hooking member 201 having a hooking groove that is opened downward is formed at the inner side surface (a surface toward the lateral plate 152) of the connection boards 200a and 200b. In the first bus bar supporting member 155, the upper end is formed of a cylinder shape without the hooking protrusion 157. The first bus bar supporting member 155 and the second bus bar supporting member 156 are alternately disposed. When bonding the connection boards 200a and 200b to the lateral plate 152, as the hooking protrusion 157 is inserted to the hooking groove of the hooking member 201 to be fixed, the connection boards 200a and 200b are prevented from moving by the lateral plate 152.

A hooking part 154 is formed at the lateral plate 152, and the hooking part 154 may be disposed between the air channels 160 adjacent to each other among the plurality of air channels 160. The protrusion formed in the connection boards 200a and 200 is inserted to the hooking part 154 so that the connection boards 200a and 200b may be prevented from being separated from the lateral plate 152.

Referring to FIG. 9, in the state in which the connection boards 200a and 200b are bonded to the lateral plate 152, the end plate 1500 is installed outside the connection board 200a and 200b, thereby protecting the connection boards 200a and 200b and simultaneously reinforcing the fixing of the connection board 200a and 200b.

Referring to FIG. 10 and FIG. 11, the battery cell stacking member 100 is mounted to the housing 150 to which the connection boards 200a and 200b are bonded, and the end plate 1500 is installed outside the connection boards 200a and 200b and then is covered by the top cover 2000 to complete a battery module 1000. In the state in which the top cover 2000 covers the battery cell stacking member 100, the connection boards 200a and 200b, the housing 150, and the end plate 1500 complete the battery module 1000, and a bar-type coupling part 2001 formed under the top cover 2000 is inserted between a pair of coupling protrusions 202 formed at the upper end of the connection board 200a and 200b. Thus, it possible to more reliably prevent the y-direction movement or z-direction movement of the connection boards 200a and 200b. The coupling protrusions 202 may be formed in a plurality of pairs on the connection boards 200a and 200b, and a plurality of bar-type coupling parts 2001 formed in the bottom of the top cover 2000 may be formed.

The battery module according to the present invention described above may form a battery pack, or a plurality of battery modules may be electrically connected to form the battery pack.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

150: housing
152: lateral plate
157: hooking protrusion
200a, 200b: connection board
201: hooking member
202: coupling protrusion
1500: end plate
2000: top cover
2001: bar type coupling part

What is claimed is:
1. A battery module comprising:
a housing configured to receive a plurality of battery cells therein, the housing including a bottom plate and a lateral plate; and
a first connection board disposed at a first end of the housing, the first connection board being securely coupled to the lateral plate,
wherein the lateral plate includes a plurality of bus bar supporting members, each of the plurality of bus bar supporting members having an elongated shape projecting upwardly away from the bottom plate along a respective longitudinal axis extending perpendicularly to the bottom plate, each of the plurality of bus bar supporting members having a longitudinal length defined along the respective longitudinal axis that is longer than all dimensions of the respective one of the plurality of bus bar supporting members defined orthogonally to the longitudinal axis, at least some of the plurality of bus bar supporting members having a respective hooking protrusion positioned thereon at a location spaced away from the bottom plate along the respective longitudinal axis, each of the hooking protrusions extending upwardly, and wherein the first connection board includes a plurality of hooking members each having a hooking groove oriented downwardly, such that each of the hooking protrusions are received within a respective one of the hooking grooves when the first connection board is securely coupled to the lateral plate.

2. The battery module of claim 1, wherein
the plurality of bus bar supporting members include a plurality of first bus bar supporting members and a plurality of second bus bar supporting members, each of the first bus bar supporting members lacking one of the hooking protrusions, and each of the second bus bar supporting members having one of the hooking protrusions, and wherein the first bus bar supporting members are alternately arranged with the second bus bar supporting members.

3. The battery module of claim 2, further comprising
an end plate covering an outer side of the first connection board, and wherein the first connection board is disposed between the lateral plate and the end plate.

4. The battery module of claim 3, further comprising
a top cover covering the housing, the first connection board, and the end plate,
wherein the top cover has at least one bar type of coupling part, the first connection board has an upper end including a plurality of coupling protrusions, and each bar type of coupling part is inserted between a pair of the coupling protrusions.

5. The battery module of claim 1, further comprising
an end plate covering an outside of the first connection board, wherein the first connection board is disposed between the lateral plate and the end plate.

6. The battery module of claim 5, further comprising
a top cover covering the housing, the plurality of battery cells, the first connection board, and the end plate,
wherein the top cover has at least one bar type of coupling part, the first connection board has an upper end including a plurality of coupling protrusions, and each bar type of coupling part is inserted between a pair of the coupling protrusions.

7. A battery pack comprising
the battery module of claim 1.

8. The battery module of claim 1, further comprising the plurality of battery cells received within the housing.

9. The battery module of claim 1, further comprising a second connection board disposed at a second end of the housing, the second connection board being securely coupled to the lateral plate.

10. The battery module of claim 1, wherein the lateral plate extends perpendicularly to the bottom plate to an upper edge spaced away from the bottom plate by a first distance, and wherein the location of each of the hooking protrusions is spaced away from the bottom plate by a second distance greater than the first distance.

11. The battery module of claim 1, wherein the lateral plate extends perpendicularly to the bottom plate to an upper edge spaced away from the bottom plate by a first distance, and wherein the longitudinal length of each of the plurality of bus bar supporting members is greater than the first distance.

12. A battery module comprising:
a housing configured to receive a plurality of battery cells therein, the housing including a bottom plate and a lateral plate;
a first connection board disposed at a first end of the housing the first connection board being securely coupled to the lateral plate;
an end plate covering an outside of the first connection board, wherein the first connection board is disposed between the lateral plate and the end plate; and
a top cover covering the housing, the plurality of battery cells, the first connection board, and the end plate,
wherein the top cover has at least one bar type of coupling part, the first connection board has an upper end including a plurality of coupling protrusions, and each bar type of coupling part is inserted between a pair of the coupling protrusions, and
wherein the lateral plate includes a plurality of bus bar supporting members, at least some of the plurality of bus bar supporting members having a respective hooking protrusion extending upwardly, and wherein the first connection board includes a plurality of hooking members each having a hooking groove oriented downwardly, such that each of the hooking protrusions are received within a respective one of the hooking grooves when the first connection board is securely coupled to the lateral plate.

13. The battery module of claim 12, wherein
the plurality of bus bar supporting members include a plurality of first bus bar supporting members and a plurality of second bus bar supporting members, each of the first bus bar supporting members lacking one of the hooking protrusions, and each of the second bus bar supporting members having one of the hooking protrusions, and wherein the first bus bar supporting members are alternately arranged with the second bus bar supporting members.

* * * * *